United States Patent
Nagayasu et al.

(10) Patent No.: US 9,155,993 B2
(45) Date of Patent: Oct. 13, 2015

(54) EXHAUST-GAS TREATMENT APPARATUS AND EXHAUST-GAS TREATMENT METHOD

(75) Inventors: Hiromitsu Nagayasu, Hyogo (JP); Yasutoshi Ueda, Hyogo (JP); Ryokichi Hamaguchi, Hyogo (JP); Susumu Okino, Hiroshima (JP); Morio Kagami, Hyogo (JP)

(73) Assignee: MITSUBISHI HEAVY INDUSTRIES ENVIRONMENT ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 12/593,300

(22) PCT Filed: Mar. 31, 2008

(86) PCT No.: PCT/JP2008/056300
§ 371 (c)(1),
(2), (4) Date: Sep. 28, 2009

(87) PCT Pub. No.: WO2008/123489
PCT Pub. Date: Oct. 16, 2008

(65) Prior Publication Data
US 2010/0119428 A1      May 13, 2010

(30) Foreign Application Priority Data
Mar. 30, 2007   (JP) .................................. 2007-092512

(51) Int. Cl.
*B01D 53/50*    (2006.01)
*B03C 3/013*    (2006.01)
(Continued)

(52) U.S. Cl.
CPC ............... *B01D 53/504* (2013.01); *B03C 3/013* (2013.01); *B03C 3/017* (2013.01); *B03C 3/16* (2013.01);
(Continued)

(58) Field of Classification Search
None
See application file for complete search history.

(56) References Cited

U.S. PATENT DOCUMENTS 3,904,742 A  *  9/1975  Akimoto ..................... 423/554
4,539,190 A  *  9/1985  Shinoda et al. ........... 423/240 R
(Continued)

FOREIGN PATENT DOCUMENTS

EP       1142625       *  3/1996
JP     62-197130 A        8/1987
(Continued)

OTHER PUBLICATIONS

International Search Report of PCT/JP2008/056300, mailing date of Jun. 17, 2008.
(Continued)

*Primary Examiner* — Melvin C Mayes
*Assistant Examiner* — Sheng H Davis
(74) *Attorney, Agent, or Firm* — Westerman, Hattori, Daniels & Adrian, LLP

(57) ABSTRACT

An object is to provide an exhaust-gas treatment apparatus capable of realizing a dissolved-salt spray method easily and at low cost. An exhaust-gas treatment apparatus that removes $SO_2$ and $SO_3$ contained in combustion exhaust gas includes a desulfurization apparatus based on the lime-gypsum method. Desulfurizing effluent, containing dissolved salt, from the desulfurization apparatus is sprayed to an upstream side of the desulfurization apparatus to remove $SO_3$. A wet electrical dust precipitator may be provided downstream of the desulfurization apparatus. Furthermore, effluent from the wet electrical dust precipitator may be made to merge with the desulfurizing effluent from the desulfurization apparatus.

1 Claim, 8 Drawing Sheets

(51) Int. Cl.
*B03C 3/017* (2006.01)
*B03C 3/16* (2006.01)
*F23J 15/02* (2006.01)
*F23J 15/04* (2006.01)

(52) U.S. Cl.
CPC *F23J 15/02* (2013.01); *F23J 15/04* (2013.01); *B01D 2251/404* (2013.01); *F23J 2215/20* (2013.01); *F23J 2217/102* (2013.01); *F23J 2219/40* (2013.01)

(56) References Cited

U.S. PATENT DOCUMENTS

| | | | | |
|---|---|---|---|---|
| 4,643,813 | A | * | 2/1987 | Sato et al. ............... 204/157.78 |
| 4,649,034 | A | | 3/1987 | Rutledge |
| 4,687,649 | A | * | 8/1987 | Kuroda et al. ........... 423/243.03 |
| 4,853,194 | A | | 8/1989 | Hino et al. |
| 4,915,920 | A | | 4/1990 | Kobayashi |
| 5,270,015 | A | * | 12/1993 | Rochelle et al. ............... 422/168 |
| 5,599,508 | A | * | 2/1997 | Martinelli et al. ............ 422/169 |
| 5,601,791 | A | | 2/1997 | Plaks et al. |
| 5,820,831 | A | * | 10/1998 | Bresowar ..................... 422/171 |
| 6,129,910 | A | | 10/2000 | Holmes-Farley et al. |
| 6,149,713 | A | * | 11/2000 | Ochi et al. ........................ 95/28 |
| 6,203,508 | B1 | | 3/2001 | Ren et al. |
| 6,203,598 | B1 | * | 3/2001 | Hasegawa et al. ................ 95/92 |
| 6,594,553 | B1 | * | 7/2003 | Johnson et al. ................ 700/273 |
| 6,803,025 | B2 | | 10/2004 | Meserole et al. |
| 6,863,875 | B1 | * | 3/2005 | Kotake et al. ................. 423/235 |
| 7,524,470 | B2 | * | 4/2009 | Barger et al. ................. 423/210 |
| 2004/0109802 | A1 | | 6/2004 | Meserole et al. |
| 2004/0109807 | A1 | | 6/2004 | D'Alesandro |
| 2004/0120874 | A1 | * | 6/2004 | Zauderer ..................... 423/242.1 |
| 2004/0208809 | A1 | | 10/2004 | D'Alesandro |
| 2005/0066772 | A1 | | 3/2005 | Flores-Morales et al. |
| 2005/0201914 | A1 | | 9/2005 | Ritzenthaler |
| 2005/0271569 | A1 | * | 12/2005 | Pehkonen et al. ......... 423/242.1 |
| 2006/0239881 | A1 | * | 10/2006 | Nagayasu et al. ........ 423/240 R |
| 2007/0231230 | A1 | | 10/2007 | Meserole et al. |

FOREIGN PATENT DOCUMENTS

| | | | |
|---|---|---|---|
| JP | 5-57141 | A | 3/1993 |
| JP | 7-80244 | A | 3/1995 |
| JP | 7-110109 | A | 4/1995 |
| JP | 7-155537 | A | 6/1995 |
| JP | 409141126 | * | 6/1997 |
| JP | 11-76751 | A | 3/1999 |
| JP | 2000-271434 | A | 10/2000 |
| JP | 2001-62247 | A | 3/2001 |
| JP | 2001-145818 | A | 5/2001 |
| JP | 2001-205044 | A | 7/2001 |
| JP | 2006-326575 | A | 12/2006 |

OTHER PUBLICATIONS

U.S. Office Action dated Feb. 13, 2013, issued in corresponding U.S. Appl. No. 12/872,370.
U.S. Office Action dated Feb. 4, 2011, issued in corresponding U.S. Appl. No. 12/872,370 (12 pages).
U.S. Office Action dated Sep. 8, 2011, issued in corresponding U.S. Appl. No. 12/872,370 (7 pages).
Japanese Office Action dated Oct. 30, 2012, issued in corresponding Japanese Patent Application No. 2007-092512, w/ English Translation, (10 pages).
A Decision to Grant a Patent dated Sep. 24, 2013 in corresponding to Japanese Application No. 2007-092512.

* cited by examiner

EXHAUST-GAS TREATMENT APPARATUS AND EXHAUST-GAS TREATMENT METHOD

TECHNICAL FIELD

The present invention relates to an exhaust-gas treatment apparatus and an exhaust-gas treatment method for removing $SO_3$ from combustion exhaust gas.

BACKGROUND ART

Combustion exhaust gas including sulfur oxides, such as $SO_2$ and $SO_3$, is emitted from a combustion furnace in which fuels containing at least 0.5 wt % sulfur content, such as heavy fuels or coal fuels, are combusted.

$SO_3$ is produced as a result of partial oxidation of $SO_2$ at high temperatures. Therefore, the presence of $SO_3$ is about a few percent relative to $SO_2$. Nevertheless, the concentration of exhaust $SO_3$ should be controlled below a few ppm because $SO_3$ not only causes air heaters to clog or erode or chimney flues to erode but also causes blueish smoke to occur when cooled and discharged from a chimney.

Whereas well-known methods for removing $SO_3$ include the ammonia injection method in which ammonia gas is blown into combustion exhaust gas, the present inventors have proposed a method for spraying desulfurizing effluent including a dissolved salt, such as $Na_2SO_4$, into combustion exhaust gas (hereinafter, referred to as the "dissolved-salt spray method") as a technique for removing $SO_3$ easily and at a low cost (refer to Patent Document 1).

Patent Document 1:
Japanese Unexamined Patent Application, Publication No. 2006-326575

DISCLOSURE OF INVENTION

In the above-described Patent Document, however, the desulfurization apparatus is intended mainly for use with the caustic soda method or the water magnesite method. Desulfurization apparatuses based on the caustic soda method or the water magnesite method can process only about 200,000 to 300,000 $Nm^3$ of combustion exhaust gas, considering that the chemical solution to be used is expensive and that the effluent flow rate is high. Desulfurization apparatuses capable of processing a larger amount of combustion exhaust gas include those based on the lime-gypsum method that can process up to one million $Nm^3$ or more. However, it is believed that a dissolved salt in desulfurizing effluent is difficult to use with the lime-gypsum method because this method involves poorly soluble gypsum ($CaSO_4$) in the desulfurizing effluent, and hence, a dissolved salt has been obtained from a separately provided small-scale desulfurization apparatus based on the caustic soda method (refer to FIG. 2 in Patent Document 1). Because such an approach is disadvantageous in that additional cost is entailed in the new facility, there has been a growing need for an exhaust-gas treatment apparatus that includes a desulfurization apparatus based on the lime-gypsum method yet is still capable of realizing the dissolved-salt spray method more easily at lower cost.

Furthermore, it is desired to find an approach for realizing the dissolved-salt spray method without using dissolved salt in desulfurizing effluent or causing a significant increase in the operating cost, such as that resulting from introduction of a new chemical solution.

The present invention has been conceived in light of these circumstances, and an object thereof is to provide an exhaust-gas treatment apparatus and an exhaust-gas treatment method capable of realizing the dissolved-salt spray method easily and at low cost.

Another object of the present invention is to provide an exhaust-gas treatment apparatus and an exhaust-gas treatment method that include a desulfurization apparatus based on the lime-gypsum method yet are still capable of realizing the dissolved-salt spray method without extensive addition of new facilities for supplying a dissolved salt.

Still another object of the present invention is to provide an exhaust-gas treatment apparatus and an exhaust-gas treatment method for realizing the dissolved-salt spray method without causing a significant increase in the operating cost, such as that resulting from introduction of a new chemical solution, even though dissolved salt is not used in the desulfurizing effluent.

In order to solve the above-described problems, an exhaust-gas treatment apparatus and an exhaust-gas treatment method according to the present invention provide the following solutions.

Specifically, an exhaust-gas treatment apparatus according to a first aspect of the present invention is an exhaust-gas treatment apparatus that removes $SO_2$ and $SO_3$ contained in combustion exhaust gas and includes a desulfurization apparatus based on a lime-gypsum method and a spray section that sprays desulfurizing effluent from the desulfurization apparatus to an upstream side of the desulfurization apparatus.

$SO_2$ is mainly removed by the desulfurization apparatus based on the lime-gypsum method.

In the lime-gypsum method, lime is used as an absorbent. The present inventors, as a result of intensive efforts, have focused attention on the fact that Mg is contained in this lime. Consequently, the present inventors have found that the advantage afforded by the use of desulfurizing effluent containing a dissolved salt whose main raw material is this Mg is more than enough, even though the step of separating poorly soluble gypsum in the desulfurizing effluent is provided.

The reason why $SO_3$ is removed by spraying desulfurizing effluent based on the lime-gypsum method from the spray section is described below.

Desulfurizing effluent based on the lime-gypsum method contains $MgSO_4$, namely a dissolved salt, whose raw material is Mg in the form of lime. When sprayed, an aqueous solution containing this dissolved salt is transformed into atomized droplets, and the moisture content about the dissolved salt of these atomized droplets evaporates due to the combustion exhaust gas. Because the moisture content of the atomized droplets is evaporated to produce dried particles of dissolved salt in this manner, atomized particles of dissolved salt can be obtained. Then, as result of $SO_3$ coming into contact with the atomized, dried particles of dissolved salt, contaminants are adsorbed and fixed, and then removed from the gas. In short, because a large number of small, dry particles of dissolved salt can be produced by spraying an aqueous solution containing dissolved salt, a sufficient surface area required to adsorb $SO_3$ contained in the combustion exhaust gas is ensured, thereby promoting the adsorption and fixation of contaminants.

Furthermore, because desulfurizing effluent is sprayed to an upstream side of the desulfurization apparatus, the dissolved salt in the sprayed desulfurizing effluent adsorbs $SO_3$ in the combustion exhaust gas, is collected in the desulfurization apparatus, is dissolved again, and is recovered as dissolved salt. At this time, as a result of $SO_3$ reacting with limestone, gypsum ($CaSO_4.2H_2O$) is produced. Then, the recovered dissolved salt is sprayed again. As described above, because the dissolved salt in desulfurizing effluent can be circulated, the concentration of dissolved salt in the desulfurizing effluent can be increased. In addition, because it is not necessary to introduce a new chemical, the operating costs can be reduced considerably.

Because the moisture content needs to evaporate while sprayed droplets of desulfurizing effluent are floating, an environment where the exit temperature of the spray section is equal to or higher than the water evaporation temperature is preferable. Furthermore, the $SO_3$ dew-point temperature or higher at which a reaction with the dissolved salt occurs is desirable. This is because at temperatures below the dew point, the $SO_3$ gas is transformed into $SO_3$ mist and adsorption to fine particles of dry dissolved salt does not occur easily, thereby decreasing the removal capability. Therefore, the exit temperature of the spray section should be 130° C. or more, preferably 140° C. or more.

Furthermore, a two-fluid nozzle is preferable as the spray section because droplets to be sprayed can be atomized. It is preferable that droplets of desulfurizing effluent to be sprayed have diameters such that the moisture content evaporates while sprayed droplets of an aqueous solution are floating; for example, the diameter is preferably 10 μm to 100 μm, more preferably about 20 to 50 μm.

Furthermore, in the exhaust-gas treatment apparatus according to the first aspect of the present invention, a wet electrical dust precipitator may be provided at a downstream side of the desulfurization apparatus.

Dust and $SO_3$ that have not been captured by the preceding dry electrostatic precipitator, dissolved-salt spray apparatus, or desulfurization apparatus based on the lime-gypsum method can be removed by this wet electrical dust precipitator. The facility capacity (required electrode area) of the wet electrical dust precipitator is determined by the $SO_3$ concentration at the inlet of the wet electrical dust precipitator. Therefore, in combination with the dissolved-salt spray apparatus, the capacity of the wet electrical dust precipitator can be decreased.

Furthermore, in the exhaust-gas treatment apparatus with the above-described structure, effluent from the wet electrical dust precipitator may be made to merge with the desulfurizing effluent from the desulfurization apparatus.

Alkaline solutions such as a NaOH aqueous solution and a $Mg(OH)_2$ aqueous solution are supplied for neutralization to the wet electrical dust precipitator. After neutralization, these alkaline solutions are transformed into aqueous solutions containing dissolved salts such as $Na_2SO_4$ and $MgSO_4$ in the form of effluent. The concentration of dissolved salt can be increased by allowing this post-neutralization effluent to merge with the desulfurizing effluent. The $SO_3$ removal efficiency can be further enhanced by spraying desulfurizing effluent containing such post-neutralization effluent to an upstream side of the desulfurization apparatus in this manner.

Furthermore, because a neutralizer supplied to the wet electrical dust precipitator is used, it is not necessary to deliver an additional new chemical. This prevents the operating costs from rising.

In the present invention, the wet electrical dust precipitator includes a dielectric gas cleaning apparatus.

Furthermore, in either of the exhaust-gas treatment apparatuses described above, a dry electrostatic precipitator may be provided at an upstream side of the spray section, and a residue of desulfurizing effluent excluding desulfurizing effluent introduced to the spray section may be sprayed to an upstream side of the dry electrostatic precipitator, wherein the residue and the desulfurizing effluent introduced to the spray section constitute the desulfurizing effluent from the desulfurization apparatus.

The residue of desulfurizing effluent excluding the desulfurizing effluent introduced to the spray section is sprayed to an upstream side of the dry electrostatic precipitator. The moisture content of the desulfurizing effluent that has been sprayed to an upstream side of the dry electrostatic precipitator is evaporated by the sensible heat of the combustion exhaust gas flowing through the chimney flue, leaving dry solid content as a residue. This dry solid content is then removed by the dry electrostatic precipitator. Therefore, it is not necessary to separately process the desulfurizing effluent from the desulfurization apparatus. That is, a non-effluent treatment of the desulfurizing effluent is realized.

Furthermore, in either of the exhaust-gas treatment apparatuses described above, a heat exchanger that recovers heat from a combustion exhaust gas upstream of the desulfurization apparatus may be provided.

Heat can be used effectively by recovering the heat of the combustion exhaust gas with the heat exchanger. For example, the heat recovered by the heat exchanger can be supplied to boiler feedwater.

Furthermore, in the exhaust-gas treatment apparatus with the above-described structure, the heat recovered by the heat exchanger may be given to combustion exhaust gas before being released to the atmosphere.

White smoke can be prevented from occurring by increasing, by means of the heat exchanger, the temperature of the combustion exhaust gas before being released to the atmosphere.

Furthermore, in either of the exhaust-gas treatment apparatuses described above, a sedimentation tank that separates solid content of the desulfurizing effluent from the desulfurization apparatus may be provided, and a separated liquid isolated by the sedimentation tank may be supplied to the spray section.

Because of the desulfurization apparatus based on the lime-gypsum method, desulfurizing effluent contains gypsum in the form of solid content ($CaSO_4$). This solid content is separated by the sedimentation tank to obtain a separated liquid from which solid content has been removed. Then, because this separated liquid is sprayed, the risk of clogging the feed opening of the spray section with solid content can be reduced.

Furthermore, in the exhaust-gas treatment apparatus with the above-described structure, a membrane separation apparatus that membrane-separates the separated liquid from the sedimentation tank may be provided.

The solid content can be removed at a high level by supplying the separated liquid to the membrane separation apparatus, thereby further reducing the risk of clogging the feed opening of the spray section.

Furthermore, in either of the exhaust-gas treatment apparatuses described above, a salt-level measuring section that measures a concentration of dissolved salt in desulfurizing effluent supplied to the spray section may be provided.

Dissolved salt can be sprayed at an appropriate salt level by measuring the concentration of dissolved salt in the desulfurizing effluent supplied to the spray section and, for example, by increasing/decreasing the volume of effluent.

A densimeter or a conductivity meter can be used for the salt-level measuring section.

Furthermore, in either of the exhaust-gas treatment apparatuses described above, a dissolved-salt-level adjusting section may be provided in a flow channel of desulfurizing effluent supplied to the spray section.

As a result of the dissolved-salt-level adjusting section being provided, desulfurizing effluent to be sprayed can be adjusted to exhibit a desired concentration of dissolved salt even when the desired concentration of dissolved salt cannot be attained, such as when the operation is started.

The dissolved-salt-level adjusting section includes those supplying dissolved-salt producing materials serving as raw materials for producing dissolved salts such as NaOH and Mg(OH)$_2$, as well as dissolved salts such as Na$_2$SO$_4$ and MgSO$_4$.

Furthermore, an exhaust-gas treatment apparatus according to a second aspect of the present invention is an exhaust-gas treatment apparatus that removes SO$_3$ and dust contained in a combustion exhaust gas and includes a dry electrostatic precipitator that removes dust; a dust-dissolving section that supplies an alkaline solution to dust collected by the dry electrostatic precipitator to dissolve the dust; and a spray section that sprays effluent from the dust-dissolving section to an upstream side of the dry electrostatic precipitator.

Dust is removed by the dry electrostatic precipitator. Furthermore, SO$_3$ is removed by the dust solution (effluent from the dust-dissolving section) sprayed from the spray section. The reason why SO$_3$ is removed by a dust solution is described below.

Because an alkaline solution for neutralization is supplied to the dust-dissolving section, the dust solution from the dust-dissolving section contains dissolved salt, as a solute, originating from the alkaline solution such as NaOH or Mg(OH)$_2$. When sprayed, an aqueous solution containing this dissolved salt is transformed into atomized droplets, and the moisture content about the dissolved salt of these atomized droplets evaporates due to the combustion exhaust gas. Because the moisture content of the atomized droplets is evaporated to produce dried particles of dissolved salt in this manner, atomized particles of dissolved salt can be obtained. Then, as result of SO$_3$ coming into contact with the atomized, dried particles of dissolved salt, contaminants are adsorbed and fixed, and removed from the gas. In short, because a large number of small, dry particles of dissolved salt can be produced by spraying an aqueous solution containing dissolved salt, a sufficient surface area required to adsorb SO$_3$ contained in the combustion exhaust gas is ensured, thereby promoting the adsorption and fixation of contaminants.

In addition, because effluent is sprayed at an upstream side of the dry electrostatic precipitator, the dissolved salt in the effluent is dried into solid dissolved salt by the sensible heat of the combustion exhaust gas. This solid dissolved salt adsorbs SO$_3$ and is captured by the dry electrostatic precipitator. The solid dissolved salt captured by the dry electrostatic precipitator is discharged together with dust via an ash treatment facility. By introducing some of the solid dissolved salt to the dust-dissolving section and supplying an alkaline solution, an aqueous solution containing dissolved salt can be produced again and then sprayed again to an upstream side of the dry electrostatic precipitator. Because dissolved salt is circulated in this manner, the concentration of dissolved salt in the effluent can be increased. Furthermore, as a result of dissolved salt being circulated, it is not necessary to deliver many alkaline solutions for SO$_3$ removal. This helps reduce the amount of chemicals used.

Because the moisture content needs to evaporate while sprayed droplets of effluent are floating, an environment where the exit temperature of the spray section is equal to or higher than the water evaporation temperature is preferable. Furthermore, the SO$_3$ dew-point temperature or higher at which a reaction with the dissolved salt occurs is desirable. This is because at temperatures below the dew point, the SO$_3$ gas is transformed into SO$_3$ mist and adsorption to fine particles of dry dissolved salt does not occur easily, thereby decreasing the removal capability. Therefore, the exit temperature of the spray section should be 130° C. or more, preferably 140° C. or more.

Furthermore, a two-fluid nozzle is preferable as the spray section in that droplets to be sprayed can be atomized. It is preferable that droplets of effluent to be sprayed have diameters such that the moisture content evaporates while sprayed droplets of an aqueous solution are floating; for example, the diameter is preferably 10 μm to 100 μm, more preferably about 20 to 50 μm.

In addition, any concentration of dissolved salt can be obtained by adjusting the concentration of an alkaline solution supplied as a neutralizer.

Furthermore, in the exhaust-gas treatment apparatus according to the second aspect of the present invention, a desulfurization apparatus based on a lime-gypsum method may be provided downstream of the dry electrostatic precipitator, and desulfurizing effluent from the desulfurization apparatus may be introduced to the dust-dissolving section.

Desulfurizing effluent can be used for dust dissolution by introducing the desulfurizing effluent to the dust-dissolving section.

Furthermore, if all desulfurizing effluent is used for dust dissolution, a non-effluent treatment of desulfurizing effluent can be realized.

In addition, because the desulfurizing effluent contains dissolved salt, the concentration of dissolved salt in the effluent sprayed to the combustion exhaust gas can be increased.

Furthermore, in the exhaust-gas treatment apparatus with the above-described structure, a gypsum separator that separates gypsum from the desulfurizing effluent from the desulfurization apparatus may be provided, and the effluent discharged from the dust-dissolving section may be supplied to the gypsum separator.

A dust solution is supplied to the gypsum separator. Because the solid content is separated in the gypsum separator, gypsum mixed with insoluble matter in the dust solution is produced. Because reuse or discarding is performed in the form of gypsum mixed with discharged dust, the need for separately providing a dust treatment apparatus is eliminated, thus simplifying the facility.

In addition, an exhaust-gas treatment method according to a third aspect of the present invention is an exhaust-gas treatment method of removing SO$_2$ and SO$_3$ contained in combustion exhaust gas and includes spraying desulfurizing effluent from a desulfurization apparatus based on a lime-gypsum method to an upstream side of the desulfurization apparatus.

Furthermore, an exhaust-gas treatment method according to a fourth aspect of the present invention includes supplying an alkaline solution to dust collected by a dry electrostatic precipitator for removing dust to dissolve the dust; and spraying effluent resulting after the dust is dissolved to an upstream side of the dry electrostatic precipitator.

More specifically, an alkaline solution is supplied to some of the dust collected by the dry electrostatic precipitator for removing dust. The alkaline solution not only neutralizes the liquid pH but also allows the concentration of salt to be adjusted.

Because dissolved salt whose raw material is Mg present in the desulfurizing effluent from the desulfurization apparatus based on the lime-gypsum method is sprayed into the combustion exhaust gas to remove SO$_3$, an exhaust-gas treatment apparatus can be constructed easily at low cost without having to separately provide an apparatus for producing dissolved salt.

In addition, because the dissolved salt sprayed into the combustion exhaust gas circulates together with desulfurizing effluent, it is not necessary to provide additional chemical solutions. This considerably reduces the operating costs.

Furthermore, because effluent, from the dust-dissolving section, containing dissolved salt whose raw material is an alkaline solution is sprayed to an upstream side of the dry electrostatic precipitator to remove $SO_3$, an exhaust-gas treatment apparatus can be constructed easily and at low cost without having to separately provide an apparatus for producing dissolved salt.

In addition, because dissolved salt is recirculated for use by collecting dissolved salt with the electrical dust precipitator, it is not necessary to deliver many alkaline solutions for $SO_3$ removal. This can reduce the operating costs.

EXPLANATION OF REFERENCE SIGNS

11: dry electrostatic precipitator
13: desulfurization apparatus
15: wet electrical dust precipitator
31: sedimentation tank
35: two-fluid nozzle (spray section)
54: membrane separation apparatus

BEST MODE FOR CARRYING OUT THE INVENTION

Embodiments according to the present invention will now be described with reference to the drawings.
[First Embodiment]
A first embodiment according to the present invention will be described below.

Figure 1:
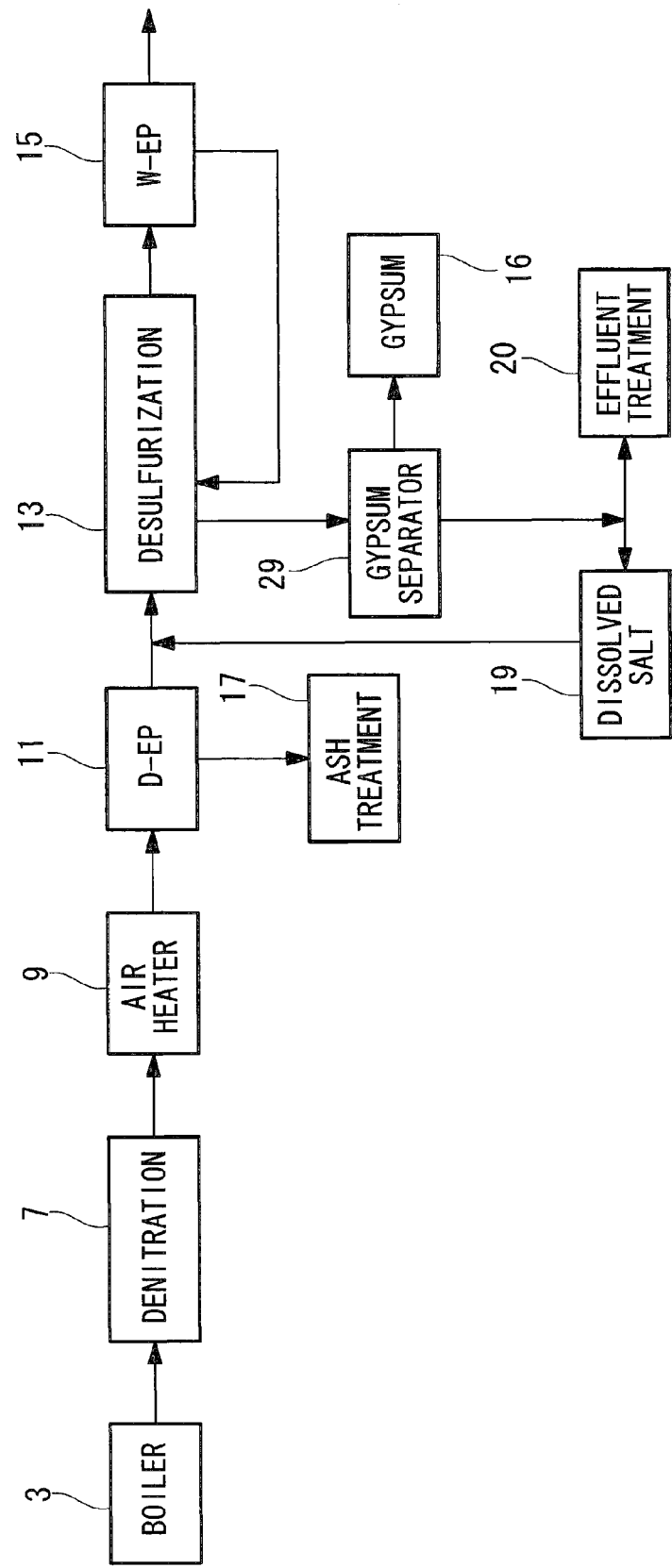
FIG. 1 is a schematic diagram depicting an exhaust-gas treatment apparatus according to a first embodiment of the present invention.

FIG. 1 shows an exhaust-gas treatment apparatus according to this embodiment.

The exhaust-gas treatment apparatus is disposed in a chimney flue downstream of a boiler 3 provided with a combustion furnace and includes a denitration apparatus 7; an air heater 9; a dry electrostatic precipitator (D-EP) 11; a desulfurization apparatus 13 based on the lime-gypsum method; and a wet electrical dust precipitator (W-EP) 15.

The boiler 3 is, for example, an oil-fired boiler for combusting heavy oil containing at least 0.5 wt % sulfur content.

The denitration apparatus 7 removes nitrogen oxides (NOx) contained in the combustion exhaust gas from the boiler 3.

The air heater 9 performs heat exchange between combustion air supplied to the boiler 3 and combustion exhaust gas. Because of this, the combustion air is heated by the sensible heat of the combustion exhaust gas and supplied to the boiler 3.

The dry electrostatic precipitator 11 electrically captures dust in the combustion exhaust gas. The dust collected by the dry electrostatic precipitator 11 is processed by an ash treatment apparatus (dust treatment apparatus) 17.

The desulfurization apparatus 13 mainly removes $SO_2$ in the combustion exhaust gas by the lime-gypsum method. The desulfurizing effluent from the desulfurization apparatus 13 is introduced to a gypsum separator 29, where gypsum 16 is separated. The desulfurizing effluent flowing out of the gypsum separator 29 is sprayed upstream of the desulfurization apparatus 13 as desulfurizing effluent containing dissolved salt 19. More specifically, some of the desulfurizing effluent is sprayed by a two-fluid nozzle (refer to reference numeral 35 in FIG. 2) serving as a spray section disposed at a position close to the desulfurization apparatus 13 in the chimney flue between the dry electrostatic precipitator 11 and the desulfurization apparatus 13. The two-fluid nozzle changes liquid into very fine particles by means of pressurized air, and the sprayed desulfurizing effluent is preferably 10 µm to 100 µm, more preferably 20 to 50 µm, and still more preferably 25 to 35 µm in diameter.

Because the moisture content needs to evaporate while droplets of sprayed desulfurizing effluent are floating, the environment is preferably at the water evaporating temperature or higher. Furthermore, the temperature is preferably equal to or higher than the $SO_3$ dew-point temperature at which a reaction with dissolved salt occurs. This is because, at a temperature below the dew point, the $SO_3$ gas is transformed into $SO_3$ mist and it becomes difficult to adhere to very fine particles of dry dissolved salt, thus decreasing the removal capability. For this reason, the exit temperature of the two-fluid nozzle is 130° C. or higher, and preferably 140° C. or higher.

A residue of desulfurizing effluent that has not been sprayed upstream of the desulfurization apparatus 13 is processed by an effluent treatment apparatus 20 and then discharged outside.

The wet electrical dust precipitator 15 removes dust and $SO_3$. An NaOH aqueous solution for neutralization is supplied to the wet electrical dust precipitator 15, as described below, and neutralized effluent merges with the desulfurizing effluent from the desulfurization apparatus 13.

A dielectric gas cleaning apparatus that dielectrically polarizes dielectric particles, such as sprayed water, capture precharged dust or $SO_3$ by the Coulomb force acting among the dielectric particles may be used as the wet electrical dust precipitator 15.

Figure 2:
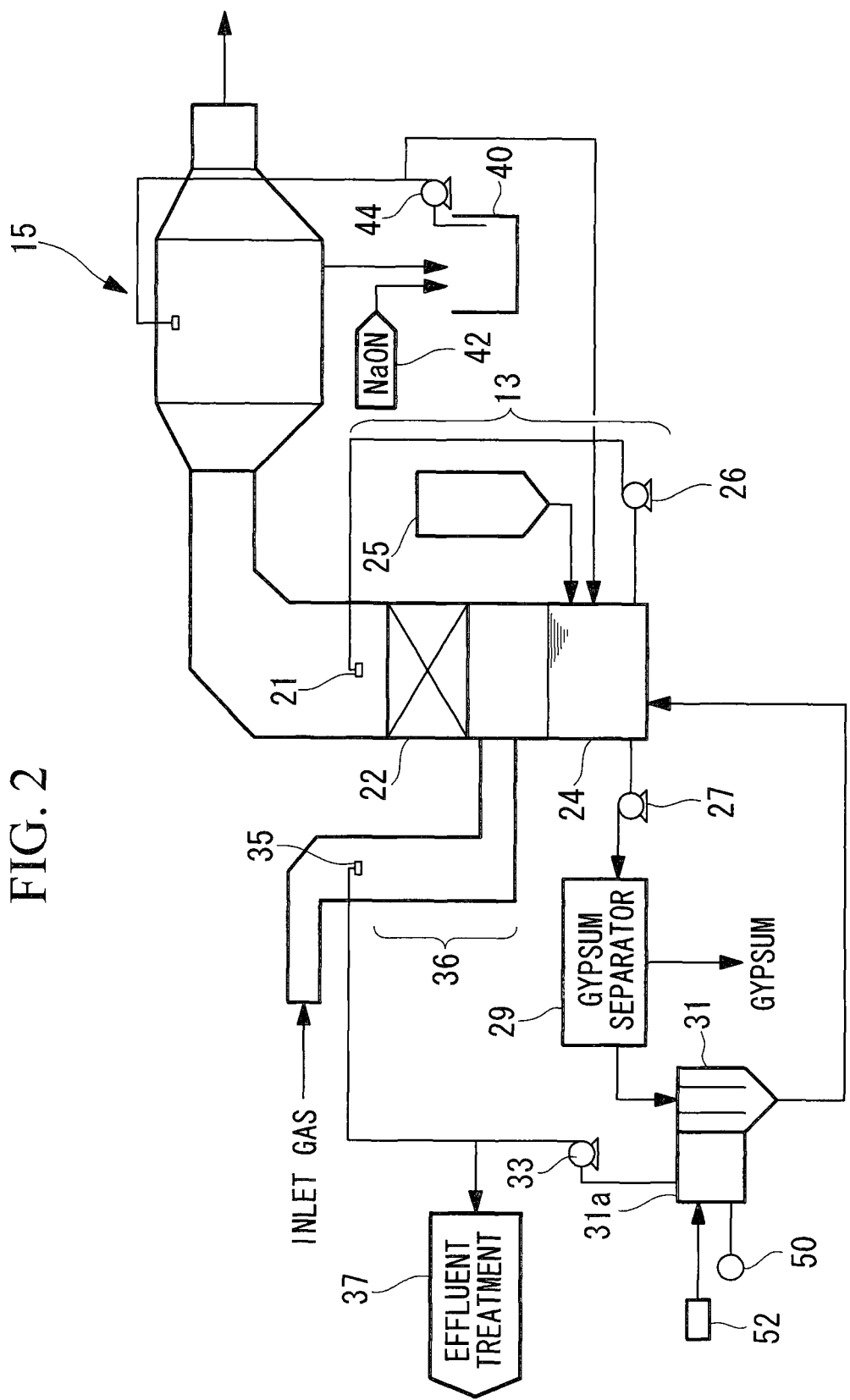
FIG. 2 is a schematic diagram depicting parts surrounding a desulfurization apparatus and a wet electrical dust precipitator in FIG. 1.

FIG. 2 shows the structure downstream of the dry electrostatic precipitator 11 shown in FIG. 1. More specifically, the figure depicts the desulfurization apparatus 13 and the wet electrical dust precipitator 15.

The desulfurization apparatus 13 includes an absorbent spray 21 that sprays an absorbent containing $CaCO_3$, a reaction layer 22 disposed below the absorbent spray 21, and a reservoir 24 disposed below the reaction layer 22.

A liquid-jet column, a spray tower, or a plastic packed bed may be used for the reaction layer 22.

An absorbent feed pump 26 is disposed between the absorbent spray 21 and the reservoir 24, and the absorbent in the reservoir 24 is sucked by this absorbent feed pump 26 into the absorbent spray 21 and circulated.

Limestone is supplied from a limestone feed section 25 to the reservoir 24, so that absorbent slurry containing $CaCO_3$ is produced. Because limestone contains about 0.5 to 2 wt % Mg, Mg also dissolves as a result of the limestone being dissolved in the desulfurization apparatus and reacts with $SO_2$ in the gas, thereby producing a Mg dissolved salt. Desulfurizing effluent containing the produced $MgSO_4$ is introduced via an eductor pump 27 to the gypsum separator 29, together with gypsum.

$CaSO_4$ is also dissolved in some of the desulfurizing effluent (the solubility of $CaSO_4$ is 2000 mg/l).

The gypsum in the form of solid content is separated from liquid in the gypsum separator 29. The separated gypsum is discharged outside for reuse. The liquid separated by the gypsum separator 29 is introduced as desulfurizing effluent into a sedimentation tank 31. Particulate solid content that has not been separated in the gypsum separator 29 is further separated in the sedimentation tank 31. In the sedimentation tank 31, particulate solid content with high specific gravity is sedimented. The sedimented liquid containing the sedimented particulate solid content is taken out from below and is returned to the reservoir 24.

The supernatant liquor of the desulfurizing effluent that has been separated in the sedimentation tank 31 is taken out by a dissolved-salt spray pump 33 and is introduced to a two-fluid nozzle 35. At this time, the rest of desulfurizing effluent is branched off, is processed by an effluent treatment apparatus 37, and is then discharged outside.

Desulfurizing effluent (dissolved salt) is sprayed from the two-fluid nozzle 35 to a dissolved-salt spray area 36 in the chimney flue extending substantially vertically.

An antechamber 31a of the sedimentation tank 31 is provided with a salt level sensor (salt-level measuring section) 50 so that the concentration of dissolved salt in the desulfurizing effluent to be supplied to the two-fluid nozzle 35 can be measured. For example, a densimeter or a conductivity meter may be used for the salt level sensor 50.

The antechamber 31a of the sedimentation tank 31 is also provided with a dissolved-salt feed section (dissolved-salt-level adjusting section) 52. Dissolved-salt producing materials serving as raw materials for producing dissolved salts, such as NaOH and $Mg(OH)_2$, and dissolved salts such as $Na_2SO_4$ and $MgSO_4$ are supplied from the dissolved-salt feed section 52.

A washing-water tank 40 is disposed near the wet electrical dust precipitator 15. NaOH is supplied to this washing-water tank 40 from an alkaline-water feed section 42 in order to prevent a pH decrease resulting from $SO_2$ and $SO_3$ being adsorbed and removed in the wet electrical dust precipitator 15. The washing water, containing NaOH, pooled in the washing-water tank 40 is introduced by a washing-water feed pump 44 to the wet electrical dust precipitator 15. The corrosion of components in the apparatus is prevented by supplying this washing water for neutralization to the wet electrical dust precipitator 15. In the wet electrical dust precipitator 15, a dissolved salt ($Na_2SO_4$) is generated as a result of NaOH in the washing water reacting with $SO_2$ and $SO_3$ in the combustion exhaust gas. In this manner, the washing water that has passed through the wet electrical dust precipitator 15 after neutralization is discharged to the washing tank 40. Therefore, $Na_2SO_4$ in the form of dissolved salt is present in the effluent discharged to the washing-water tank 40. While the effluent pooled in the washing-water tank 40 is re-introduced by the washing-water feed pump 44 to the wet electrical dust precipitator 15, some of the effluent is supplied to the reservoir 24 of the desulfurization apparatus 13. By allowing some of the effluent from the wet electrical dust precipitator 15 to merge with the desulfurizing effluent from the desulfurization apparatus 13 in this manner, $Na_2SO_4$ in the form of dissolved salt present in the effluent from the wet electrical dust precipitator 15 is added to the desulfurizing effluent. As a result, the concentration of dissolved salt in the desulfurizing effluent increases.

The exhaust-gas treatment apparatus with the above-described structure is operated as follows. First, the operation during steady operation is described, followed by the operation during initial operation.

<During Steady Operation>

When heavy oil containing a large sulfur content is combusted in the boiler 3, combustion exhaust gas containing $SO_2$ is discharged to the downstream chimney flue. Some (a few percent) of the $SO_2$ is oxidized into $SO_3$ at high-temperature sections in the boiler 3 and the denitration apparatus 7.

The combustion exhaust gas that has passed through the denitration apparatus 7 gives up some of its sensible heat to combustion air through the air heater 9. At this time, the temperature of combustion exhaust gas decreases to about 160 to 200° C.

The combustion exhaust gas that has passed through the air heater 9 is introduced to the dry electrostatic precipitator 11, and dust in the combustion exhaust gas is removed. The removed dust is processed by the ash treatment apparatus 17 and is discharged outside.

The combustion exhaust gas that has passed through the dry electrostatic precipitator 11 is sprayed with desulfurizing effluent (dissolved salt) from the two-fluid nozzle 35 in the dissolved-salt spray area 36 (refer to FIG. 2) when flowing through the chimney flue before the desulfurization apparatus 13. Most of the $SO_3$ is removed by desulfurizing effluent atomized by the two-fluid nozzle 35. Specifically, when sprayed with desulfurizing effluent containing a $MgSO_4$ aqueous solution and a $Na_2SO_4$ aqueous solution in the form of dissolved salt, $SO_3$ is removed from the gas as a result of being adsorbed to and fixed with the atomized dry particles of dissolved salt. $MgSO_4$ in the desulfurizing effluent is based on the limestone supplied as a raw material to the desulfurization apparatus 13, whereas $Na_2SO_4$ in the desulfurizing effluent is based on NaOH added as a raw material to washing water that is supplied to the wet electrical dust precipitator 15.

Reaction formulae in the process of removing $SO_3$ with particles of dissolved salts are shown below as one example. Because these reaction formulae vary depending on the amount of sprayed dissolved salts, the actual $SO_3$-removal mechanism is not limited to these reaction formulae. Particles of dissolved salts ($MgSO_4$ and $Na_2SO_4$) that have been dried as a result of being sprayed into the combustion gas are subjected to the reaction processes with $SO_3$, specified in the formulae below, thereby producing $(Mg)_{1/2}HSO_4 \cdot H_2O$(solid) and $NaHSO_4 \cdot H_2O$(solid).

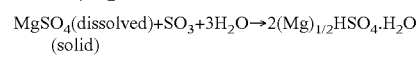
$MgSO_4$(dissolved)+$SO_3$+$3H_2O \rightarrow 2(Mg)_{1/2}HSO_4 \cdot H_2O$ (solid)

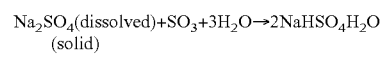
$Na_2SO_4$(dissolved)+$SO_3$+$3H_2O \rightarrow 2NaHSO_4 H_2O$ (solid)

Combustion exhaust gas from which most $SO_3$ has been removed with dissolved salts supplied from the two-fluid nozzle 35 is introduced to the desulfurization apparatus 13.

In the desulfurization apparatus 13, $SO_2$ is removed with an absorbent that is sprayed by the absorbent spray 21. The solid dissolved salts $((Mg)_{1/2}SO4 \cdot H_2O$ and NaHSO$_4$·H$_2$O) that have been sprayed from the two-fluid nozzle 35 to adsorb SO$_3$ are also introduced to the reservoir 24 together with the absorbent. In the reservoir 24, solid dissolved salts are reproduced via the following reaction processes.

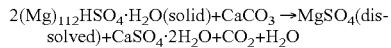

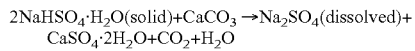

The reproduced dissolved salts (MgSO$_4$ and Na$_2$SO$_4$) are introduced to the two-fluid nozzle 35 again and used to remove SO$_3$.

Because the dissolved salts in the desulfurizing effluent are made to circulate from the reservoir 24 to the gypsum separator 29, the sedimentation tank 31, the two-fluid nozzle 35, and the reservoir 24 in that order as described above, the dissolved salts in the desulfurizing effluent are conserved, thereby eliminating the need for extra operating costs. In addition, the concentration of dissolved salt can be increased by adjusting limestone supplied from the limestone feed section 25 and the flow rate of effluent discharged to the effluent treatment facility 37.

Desulfurizing effluent (dissolved salt) supplied from the two-fluid nozzle 35 has a concentration appropriate for adsorbing SO$_3$ according to various conditions. For this reason, the concentration of dissolved salt in the desulfurizing effluent supplied from the two-fluid nozzle 35 is controlled while the concentration of dissolved salt is being monitored with the salt level sensor 50. More specifically, the flow rate of desulfurizing effluent that is sent to the effluent treatment apparatus 37 for disposal is adjusted. For example, if the concentration of dissolved salt is low, the rate of flow into the effluent treatment apparatus 37 is decreased to increase the concentration of dissolved salt. In contrast, if the concentration of dissolved salt is high, the rate of flow into the effluent treatment apparatus 37 is increased and salt in the circulating desulfurizing effluent is discarded to decrease the concentration of dissolved salt.

The concentration of dissolved salt in the desulfurizing effluent is preferably controlled to range from 30000 mg/l to 100000 mg/l.

Combustion exhaust gas from which SO$_2$ has been removed in the desulfurization apparatus 13 is introduced into the wet electrical dust precipitator 15, where remaining dust, SO$_3$, and so forth are removed from the combustion exhaust gas, which is then discharged outside via a chimney (not shown in the figure).

<During Initial Operation>

Unlike the above-described case, the desired concentration of dissolved salt may not be obtained during initial operation because of insufficient circulation of dissolved salt. If this is the case, the desired concentration of dissolved salt is achieved from the early stage by supplying dissolved-salt producing materials and dissolved salt from the dissolved-salt feed section 52. Once the concentration of dissolved salt is increased, it is not necessary to further supply dissolved-salt producing materials or dissolved salt because dissolved salt is circulated and conserved as described above.

With this embodiment, the following advantages can be afforded.

Because a dissolved salt whose raw material is Mg present in the desulfurizing effluent from the desulfurization apparatus 13 based on the lime-gypsum method is sprayed into combustion exhaust gas to remove SO$_3$, the exhaust-gas treatment apparatus can be constructed easily without having to provide a separate apparatus for producing dissolved salt.

Furthermore, because dissolved salt that is sprayed into combustion exhaust gas is dissolved again in the desulfurization apparatus after being used to remove SO$_3$, it is not necessary to supply another chemical solution to produce dissolved salt. This considerably reduces the operating cost.

In addition, by allowing effluent from the wet electrical dust precipitator 15 to merge with the desulfurizing effluent, a dissolved salt whose raw material is Na present in the effluent can be used to remove SO$_3$. Because of this, the concentration of dissolved salt can be increased easily, thereby achieving the desired concentration of dissolved salt. Furthermore, because Na present in the effluent from the wet electrical dust precipitator 15 is produced from NaOH, serving as a raw material, used for neutralization, the need for a new chemical solution is eliminated. This prevents the operating cost from rising.

In addition, because gypsum in the form of solid content (CaSO$_4$) present in the desulfurizing effluent is separated by the sedimentation tank 31 so that separated liquid from which solid content has been removed is sprayed, the risk of clogging a feed opening of the two-fluid nozzle 35 with solid content can be reduced.

Figure 3:
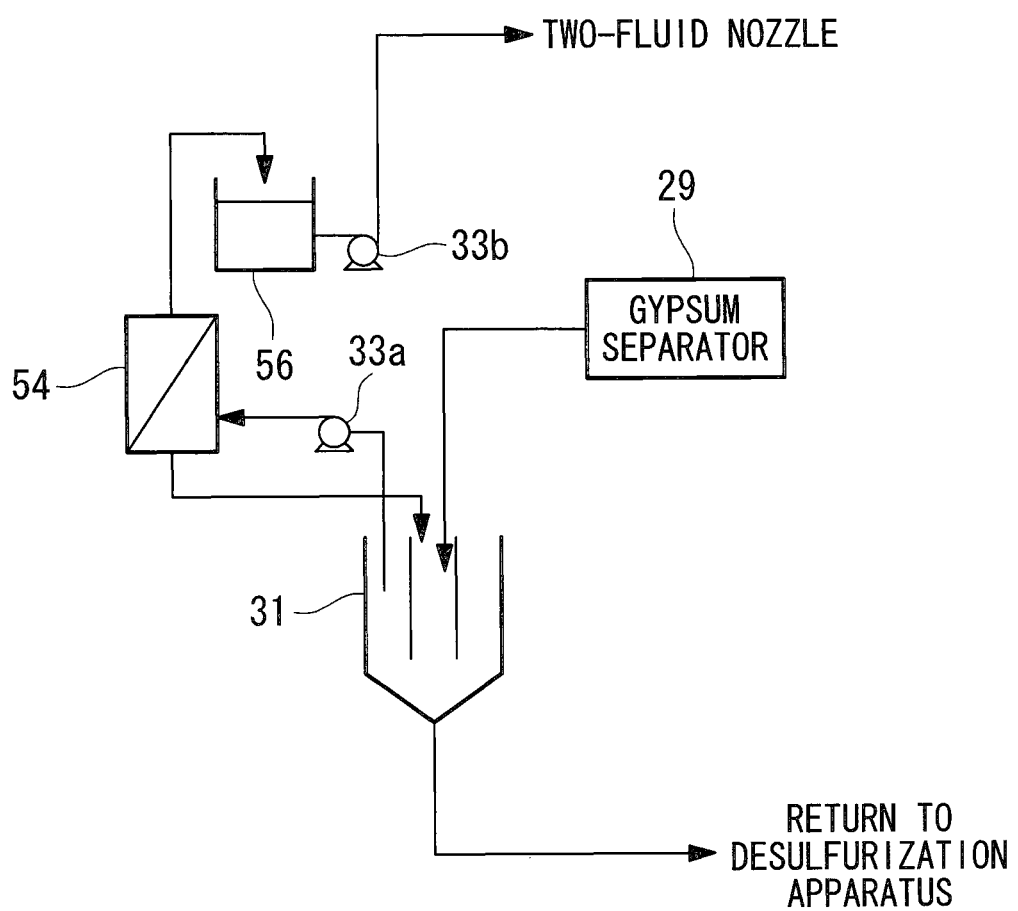
FIG. 3 is a schematic diagram depicting a structure having an additional membrane separation apparatus downstream of a sedimentation tank in FIG. 2.

As shown in FIG. 3, a membrane separation apparatus 54 may be provided downstream of the sedimentation tank 31 to further remove solid content in the desulfurizing effluent. In the figure, reference symbol 56 denotes a tank that is disposed downstream of the membrane separation apparatus 54 to pool membrane-separated desulfurizing effluent (dissolved salt), reference symbol 33a denotes a pump for supplying supernatant liquor in the sedimentation tank 31 to the membrane separation apparatus, and reference symbol 33b denotes a pump for supplying desulfurizing effluent pooled in the tank 56 to the two-fluid nozzle 35.

Because solid content is further removed from the desulfurizing effluent by the membrane separation apparatus 54 as described above, the risk of clogging the feed opening of the two-fluid nozzle 35 with solid content can be further reduced.

[Second Embodiment]

A second embodiment according to the present invention will be described with reference to FIG. 4. This embodiment differs from the first embodiment in that desulfurizing effluent is subjected to a non-effluent treatment. The other components are the same as those in the first embodiment. Therefore, the same components as those in the first embodiment are denoted with the same reference numerals, and hence, a description thereof will be omitted.

Figure 4:
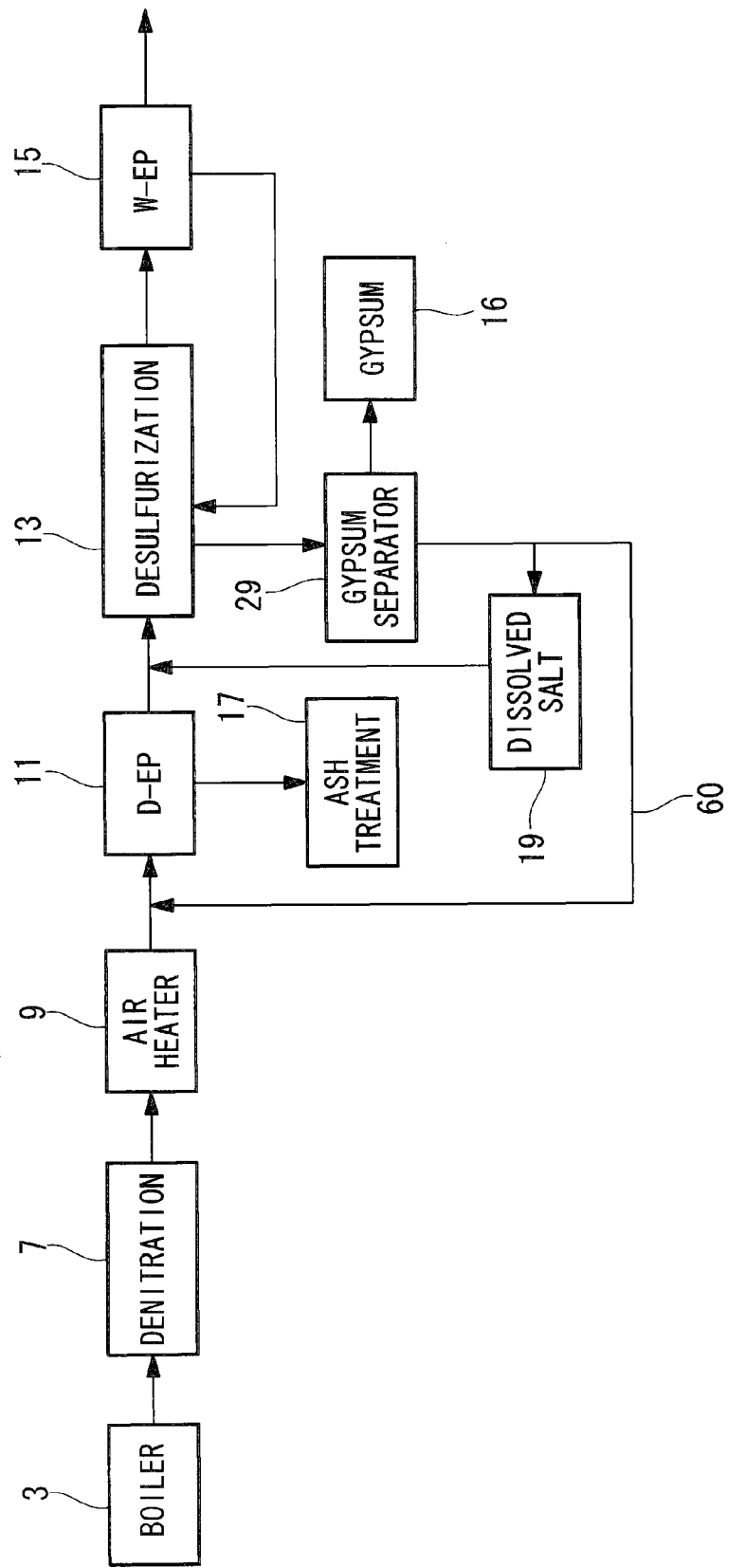
FIG. 4 is a schematic diagram depicting an exhaust-gas treatment apparatus according to a second embodiment of the present invention.

As shown in FIG. 4, a residue of desulfurizing effluent, excluding the desulfurizing effluent that is supplied from the desulfurization apparatus 13 and introduced into the two-fluid nozzle 35 (refer to FIG. 2), is sprayed upstream of the dry electrostatic precipitator 11 via a flow channel 60. The moisture content of the desulfurizing effluent that has been sprayed upstream of the dry electrostatic precipitator 11 is evaporated by sensible heat of the combustion exhaust gas flowing through the chimney flue, and consequently, dry and solid content is produced as a residue. This dry, solid content is then removed by the dry electrostatic precipitator 11. Therefore, it is no longer necessary to process the desulfurizing effluent from the desulfurization apparatus 13 by the effluent treatment apparatus 20 (refer to FIG. 1); in short, a non-effluent treatment of desulfurizing effluent can be realized.

[Third Embodiment]

A third embodiment according to the present invention will be described with reference to FIG. 5. This embodiment differs from the first embodiment in that a heat exchanger for heat exchange of combustion exhaust gas is added. The other components are the same as those in the first embodiment. Therefore, the same components as those in the first embodiment are denoted with the same reference numerals, and hence, a description thereof will be omitted. This embodiment is also applicable to the second embodiment.

Figure 5:
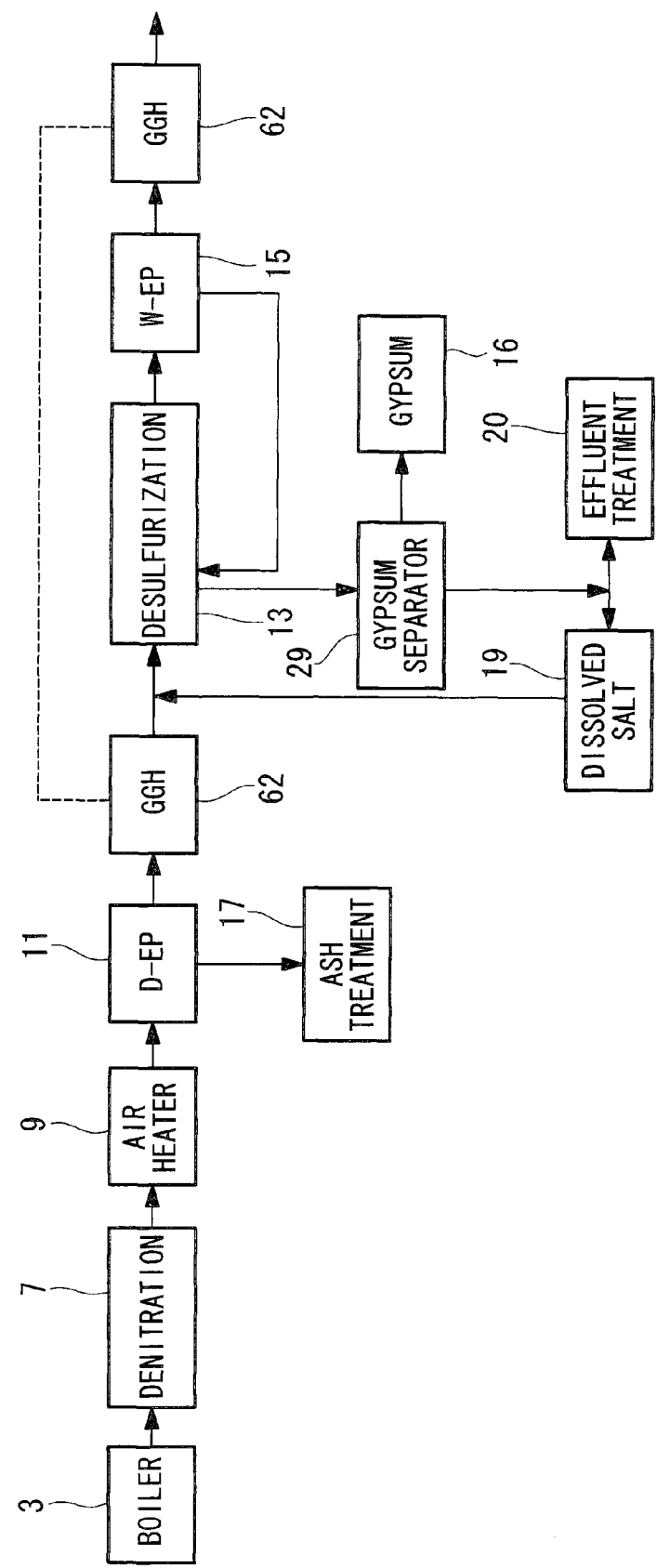
FIG. 5 is a schematic diagram depicting an exhaust-gas treatment apparatus according to a third embodiment of the present invention.

As shown in FIG. 5, a heat exchanger (gas-gas heater (GGH)) 62 that performs heat exchange between the combustion exhaust gas from the dry electrostatic precipitator 11 to the desulfurization apparatus 13 and the combustion exhaust gas before being released to the atmosphere downstream of the wet electrical dust precipitator 15 is provided. Although the heat exchanger 62 is indicated at two locations in the figure, it does not mean that two separate heat exchangers 62 are provided; it just means that heat exchange is performed between these heat exchangers 62. White smoke can be prevented from occurring by increasing, with the heat exchanger 62 described above, the temperature of combustion exhaust gas before it is released to the atmosphere.

If it is not necessary to perform heat exchange with the combustion exhaust gas before releasing it to the atmosphere, heat may be extracted by the heat exchanger from the combustion exhaust gas upstream of the desulfurization apparatus 13 so that the extracted heat can be supplied to, for example, boiler feedwater for effective utilization of the heat.

[Fourth Embodiment]

Figure 6:
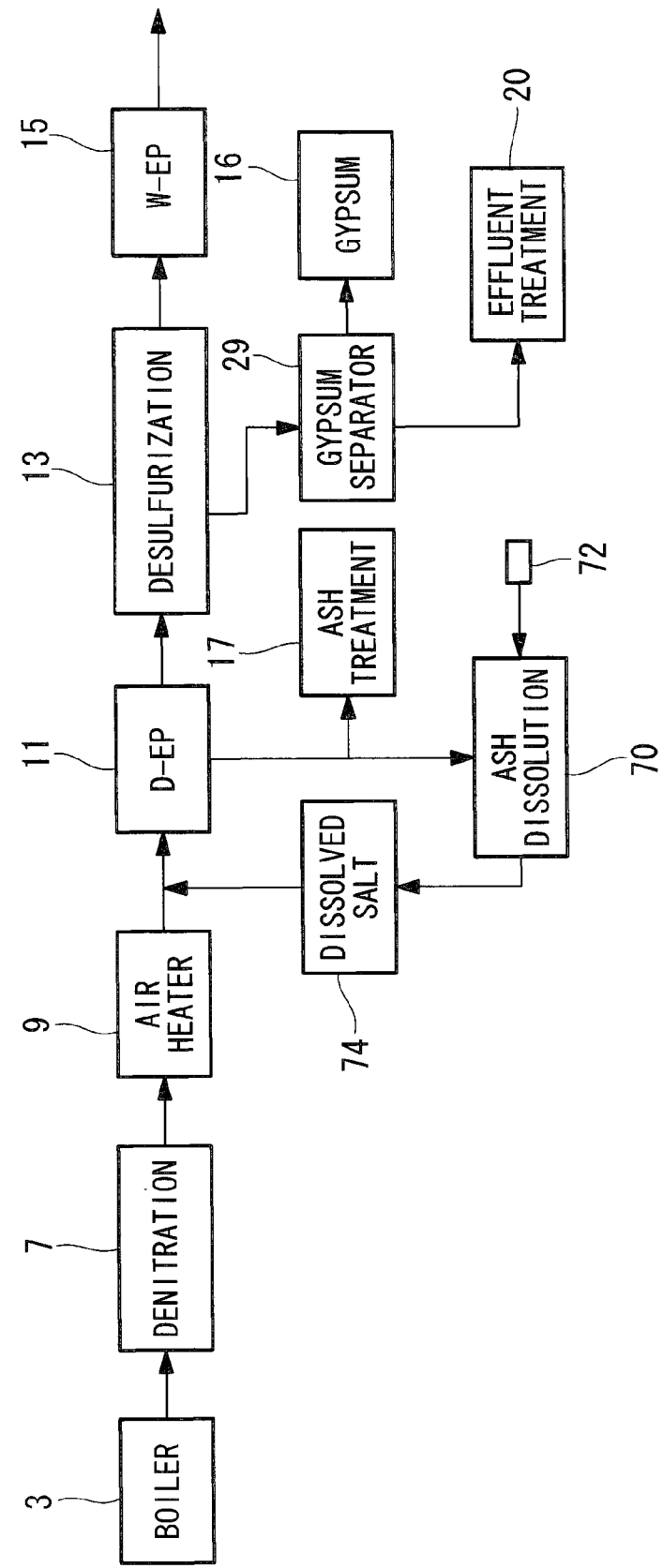
FIG. 6 is a schematic diagram depicting an exhaust-gas treatment apparatus according to a fourth embodiment of the present invention.

A fourth embodiment according to the present invention will be described with reference to FIG. 6. This embodiment differs from the first embodiment in that, unlike the first embodiment, $SO_3$ removal is not performed by means of desulfurizing effluent. The boiler 3, the denitration apparatus 7, the air heater 9, the dry electrostatic precipitator 11, the desulfurization apparatus 13, the wet electrical dust precipitator 15, and the ash treatment apparatus 17 are the same as their counterparts in the first embodiment, and hence descriptions thereof will be omitted.

Some of the dust captured by the dry electrostatic precipitator 11 is introduced to an ash-dissolving section (dust-dissolving section) 70. An alkaline aqueous solution is supplied to the ash-dissolving section 70 from an alkaline-aqueous-solution feed section 72 for neutralizing ash. For an alkaline aqueous solution, an NaOH aqueous solution, $Mg(OH)_2$, and so forth can be used. Effluent resulting after ash has been dissolved and neutralized in the ash-dissolving section 70 is sprayed as dissolved salt 74 towards the upstream end of the dry electrostatic precipitator 11, namely, the combustion exhaust gas in the chimney flue between the air heater 9 and the dry electrostatic precipitator 11. The feature that the two-fluid nozzle 35 (refer to FIG. 2) is used when the dissolved salt 74 is to be sprayed is the same as in the first embodiment.

The reaction process of removing $SO_3$ in the combustion exhaust gas is the same as in the first embodiment because the dissolved salts in effluent use Na and Mg as their raw materials in the first embodiment. More specifically, when effluent containing dissolved salt is sprayed, the effluent is transformed into atomized droplets, and then the moisture content about the dissolved salt of these atomized droplets is evaporated with combustion exhaust gas. Because dried particles of dissolved salt are produced by evaporating the moisture content of the atomized droplets as described above, atomized particles of dissolved salt can be obtained. Then, as a result of $SO_3$ coming into contact with the atomized and dried particles of dissolved salt, contaminants are adsorbed and fixed, and thus removed from the gas. In short, when an aqueous solution containing dissolved salt is sprayed, many small dried particles of dissolved salt can be produced. Therefore, a sufficient surface area required to adsorb $SO_3$ contained in the combustion exhaust gas is ensured, thereby promoting the adsorption and fixation of contaminants.

With this embodiment, the following advantages are afforded.

Because effluent is sprayed upstream of the dry electrostatic precipitator 11, the dissolved salt in the effluent is dried by sensible heat of the combustion exhaust gas into solid dissolved salt, which adsorbs $SO_3$ and is captured by the dry electrostatic precipitator 11. The solid dissolved salt captured by the dry electrostatic precipitator 11 is introduced to the ash-dissolving section 70 together with dust, is processed, and is sprayed again. Because dissolved salt is circulated in this manner, the concentration of dissolved salt in the effluent can be increased. This means that a concentration of dissolved salt appropriate for $SO_3$ removal can be achieved.

In addition, because effluent is circulated, it is not necessary to deliver many alkaline solutions for the purpose of $SO_3$ removal. This can reduce the amount of chemicals used.

Furthermore, the concentration of dissolved salt in the effluent to be sprayed into combustion exhaust gas can be adjusted easily by adjusting the concentration of an alkaline aqueous solution supplied from the alkaline-aqueous-solution feed section 72.

Although a desulfurization apparatus based on the lime-gypsum method is used in this embodiment, the present invention is not limited to this. A desulfurization apparatus based on the caustic soda method or the water magnesite method is also possible.

[Fifth Embodiment]

A fifth embodiment according to the present invention will be described with reference to FIG. 7. This embodiment differs from the fourth embodiment in that desulfurizing effluent from the desulfurization apparatus 13 is delivered to the ash-dissolving section 70. Because the other components are the same, the same components are denoted with the same reference numerals, and hence a description thereof will be omitted.

Figure 7:
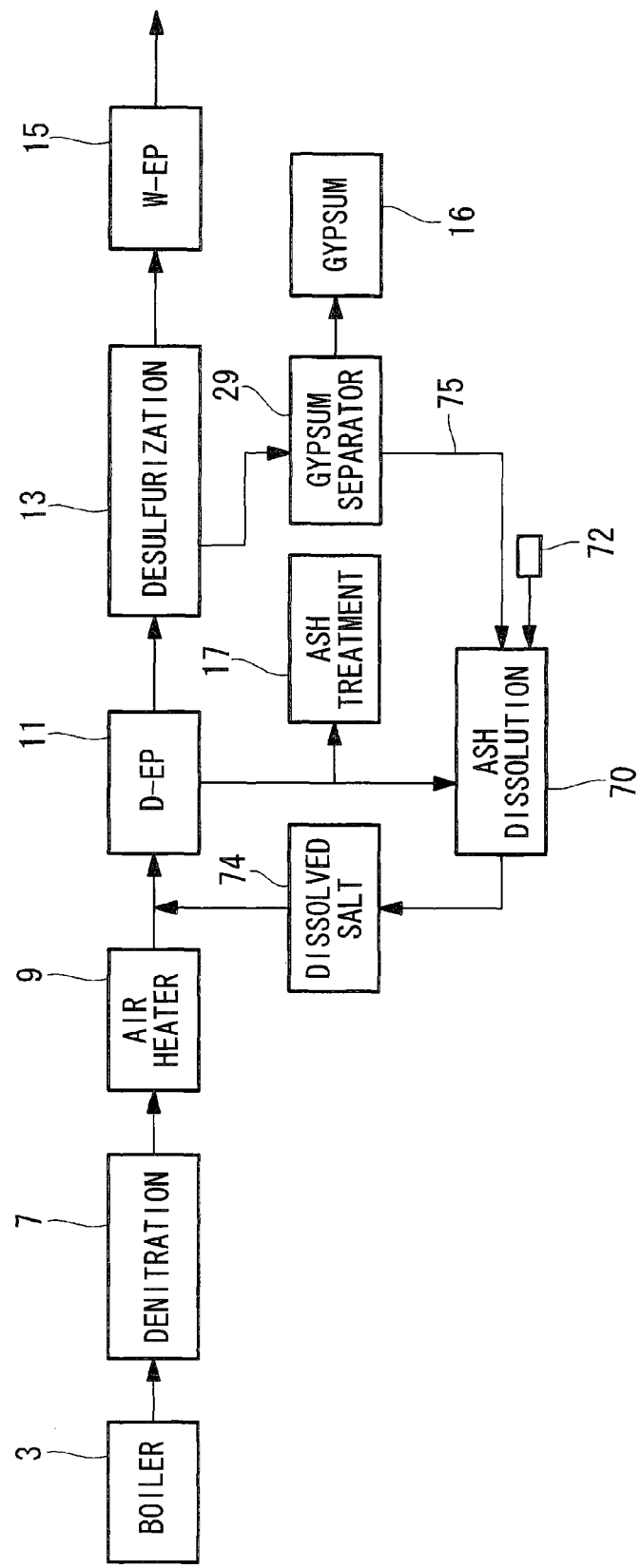
FIG. 7 is a schematic diagram depicting an exhaust-gas treatment apparatus according to a fifth embodiment of the present invention.

As shown in FIG. 7, all of the desulfurizing effluent from the desulfurization apparatus 13 is supplied to the ash-dissolving section 70 via a flow channel 75. By doing so, not only can the desulfurizing effluent be used to dissolve ash, but also a non-effluent treatment of the desulfurizing effluent can be realized.

In addition, because the desulfurizing effluent contains dissolved salt, the concentration of dissolved salt in the effluent to be sprayed into combustion exhaust gas can be increased.

[Sixth Embodiment]

A sixth embodiment according to the present invention will be described with reference to FIG. 8. This embodiment differs from the fifth embodiment in that the ash treatment apparatus 17 is omitted. Because the other components are the same, the same components are denoted with the same reference numerals, and hence a description thereof will be omitted.

Figure 8:
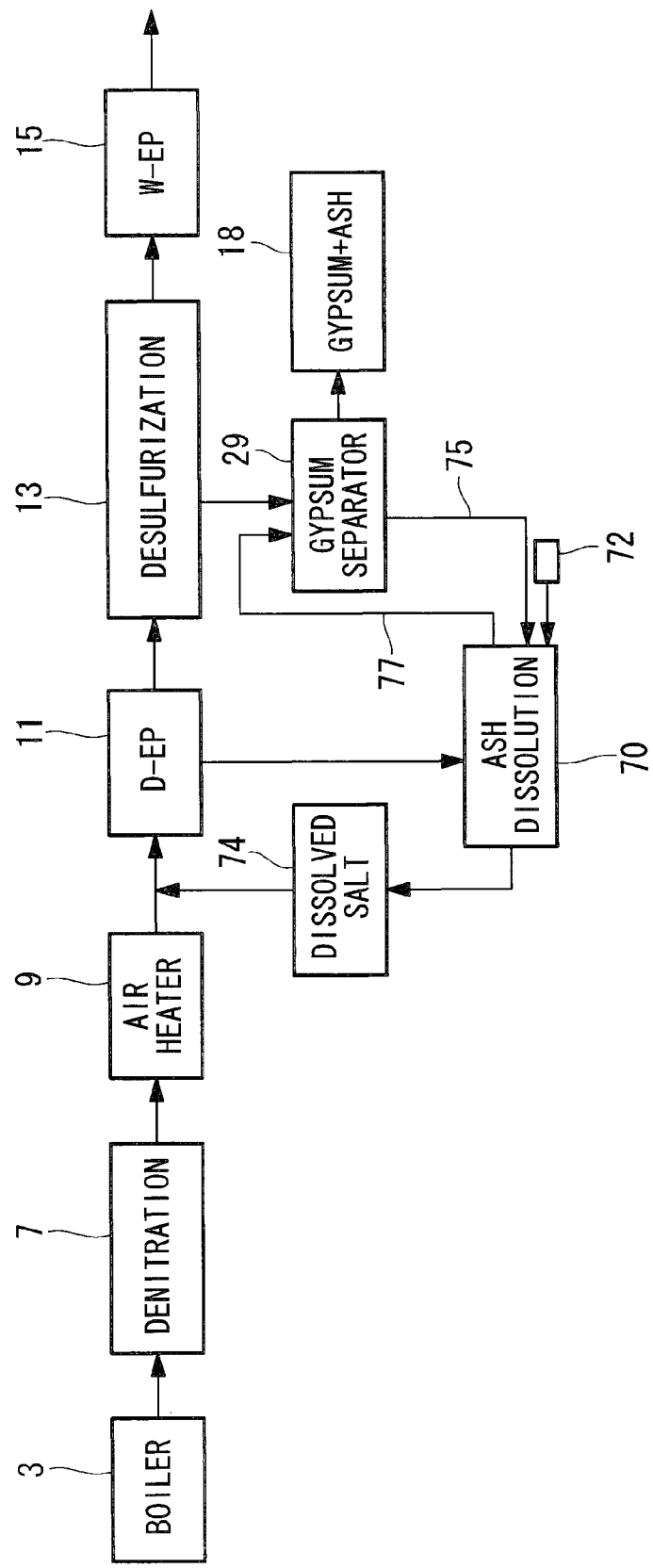
FIG. 8 is a schematic diagram depicting an exhaust-gas treatment apparatus according to a sixth embodiment of the present invention.

As shown in FIG. 8, the ash treatment apparatus 17 (refer to FIG. 7) is not provided in this embodiment. Dust captured by the dry electrostatic precipitator 11 is supplied from the ash-dissolving section 70 via a flow channel 77 to the gypsum separator 29, together with gypsum slurry from the desulfurization apparatus 13. By doing so, dust is processed together with gypsum in the desulfurizing effluent (refer to reference numeral 18).

Because reuse or disposal is performed in the form of gypsum mixed with dust as described above, it is not necessary to provide a separate ash treatment apparatus, thereby simplifying the facility.

Although the above-described embodiments have been described by way of example where an oil-fired boiler is used as a boiler, the present invention is not limited to this. The present invention is also applicable to boilers that use fuel containing a relatively large sulfur content, such as coal-fired boilers.

The invention claimed is:

1. An exhaust-gas treatment method of removing SO2 and SO3 contained in combustion exhaust gas, using a desulfurization apparatus based on a lime-gypsum method that mainly removes SO2; a gypsum separator that separates gypsum from the desulfurization effluent from the desulfurization apparatus; a sedimentation tank that further separates the desulfurizing effluent from the gypsum separator into a sedimented liquid containing sedimented particulate solid content that has not been separated in the gypsum separator and a supernatant liquor;
   a lower part of the sedimentation tank for taking out the sedimentation liquid from the sedimentation tank; a reservoir which is disposed in a bottom of the desulfurization apparatus and to which the sedimented liquid taken out from the lower part of the sedimentation tank is supplied; a pump for taking out the supernatant liquor from the sedimentation tank; and
   a spray section having a spray nozzle that is designed to spray all of the supernatant liquor as atomized droplets, being supplied by the pump, to an upstream side of the desulfurization apparatus, said method comprising:
spraying desulfurizing effluent from the desulfurization apparatus based on a lime-gypsum method to an upstream side of the desulfurization apparatus, wherein
the supernatant liquor contains MgSO4 as a dissolved salt, and
an exit temperature of the spray nozzle is 130° C. or more,
atomized and dried particles of the dissolved salt produced from the atomized droplets adsorb SO3 in the combustion exhaust gas by spraying of the supernatant liquor,
the dissolved salt is reproduced at the reservoir from the dissolved salt that adsorbed SO3, and
the supernatant liquor of the desulfurizing effluent containing the reproduced dissolved salt is sprayed from the spray nozzle.

* * * * *